United States Patent
Demas

(10) Patent No.: US 7,357,756 B2
(45) Date of Patent: Apr. 15, 2008

(54) SYSTEM FOR CREATING A PERSONALIZED FITNESS VIDEO FOR AN INDIVIDUAL

(76) Inventor: Donald P. Demas, 45 Fowler Ave., Cortlandt Manor, NY (US) 10567

( * ) Notice: Subject to any disclaimer, the term of this patent is extended or adjusted under 35 U.S.C. 154(b) by 0 days.

(21) Appl. No.: 11/446,652

(22) Filed: Jun. 5, 2006

(65) Prior Publication Data
US 2006/0229161 A1    Oct. 12, 2006

Related U.S. Application Data

(63) Continuation-in-part of application No. 10/615,200, filed on Jul. 8, 2003, now Pat. No. 7,056,267.

(51) Int. Cl.
*A63B 71/00* (2006.01)
*A63B 22/00* (2006.01)

(52) U.S. Cl. .................... 482/8; 482/1; 482/9
(58) Field of Classification Search .............. 482/1–9, 482/900–902; 434/247, 257
See application file for complete search history.

(56) References Cited

U.S. PATENT DOCUMENTS 6,447,424 B1 * 9/2002 Ashby et al. .............. 482/8
6,468,086 B1 * 10/2002 Brady-Koontz ........... 434/257
6,626,799 B2 * 9/2003 Watterson et al. ............ 482/4
6,902,513 B1 * 6/2005 McClure ..................... 482/8

OTHER PUBLICATIONS

KHFC The Corporate Wellness and Ergonomics Expert www.nutritionandexercise.com, Copyright 2002, p. 1 (Visited Aug. 16, 2006).
The Fitness Network Inc., www.thefitnessnetworkinc.com, pp. 1&2 (Visited Aug. 16, 2006).
FreeTrainers.com, www.freetrainers.com, Copyright 2000, pp. 1&2 (Visited Aug. 16, 2006).

* cited by examiner

*Primary Examiner*—Glenn Richman
(74) *Attorney, Agent, or Firm*—Bucknam & Archer

(57) ABSTRACT

An assessment of an individual with respect to flexibility, cardiovascular condition, body fat composition, muscular strength and condition, as well as other health conditions and limitations is made. Based on this assessment a specific fitness plan is determined for the individual which includes a detailed workout program of specific exercises. A plurality of video segments is selected from a series of video segments stored in a computer wherein each selected video segment is a specific exercise of the detailed workout program and recorded on a D.V.D. or video cassette tape or made available on a secure web site. Also, the assessment of the individual and the specific fitness plan including the detailed workout program can be accomplished automatically by computer.

14 Claims, 2 Drawing Sheets

SYSTEM FOR CREATING A PERSONALIZED FITNESS VIDEO FOR AN INDIVIDUAL

REFERENCE TO RELATED APPLICATIONS

This application is a continuation-in-part of U.S. patent application Ser. No. 10/615,200, filed Jul. 8, 2003, now U.S. Pat. No. 7,056,267.

FIELD OF THE INVENTION

The present invention relates to a system or method for creating a personalized fitness video for an individual and, more particularly, it relates to such a system or method whereby a fitness expert, after determining a specific fitness plan for the individual, utilizes a computer to create a video for a personalized fitness program based on the determined specific fitness plan so that the individual for whom the video is created can follow the program by playing the video and following the instructions thereof or accessing a secure web site established by the fitness expert which contains the video. The present invention also relates to a computerized system for creating a personalized fitness video for an individual.

BACKGROUND OF THE INVENTION

There are at the present time a number of fitness, exercise or workout videos available on the market. Several are produced by well-known personalities, such as Jane Fonda, Denise Austin and Richard Simmons. Other such physical fitness videos include martial arts exercise videos, etc. The underlying rationale of such fitness/exercise videos is to inspire and instruct individuals in the performance of a series of exercises designed to achieve the intended goal which is the premise of the particular video, i.e. fitness, weight loss, martial arts proficiency, etc. Thus, the fitness or exercise expert will demonstrate on the video a series of exercises with voice instructions which in that expert's opinion are generally suitable for achieving the particular goal desired. Since each such video must of necessity be addressed to a relatively wide audience without regard to any individual's physical abilities, physical needs or physical goals, a relatively large segment of the population who could potentially benefit from such a fitness/exercise program is effectively excluded. For instance, individuals with everyday problems and health issues, such as lower back problems, knee problems, high blood pressure, etc., are to a large extent precluded from participating in the exercise programs of such generic fitness/exercise videos since such generic fitness videos are incapable of addressing everyone's fitness level. Furthermore, such generic fitness/exercise videos include minimal, if any, modifications necessary to decrease the possibility of further injury to a participant with an already existing health condition or limitation.

For those individuals who wish to exercise in the privacy of their own homes and who are physically limited because of a health problem or condition and thus unable to utilize the generic fitness/exercise videos currently available, the services of a fitness expert or trainer for in-home training is required. Obviously, the employment of such a personal trainer for one or several sessions per week is expensive and certainly not within the means of many physically limited individuals who are unable to utilize the generic fitness/exercise videos.

SUMMARY OF THE INVENTION

It is, therefore, a primary object of the present invention to provide a system whereby a fitness expert can produce a personalized fitness video for an individual which takes into account that individual's physical abilities, physical needs and physical goals.

The above object is accomplished in accordance with the present invention whereby the individual for whom the fitness video is intended is assessed by the physical fitness expert for the individual's flexibility, cardiovascular condition, body fat composition, muscular strength and endurance, and other health conditions or limitations. Based on this assessment, the physical fitness expert determines a specific fitness plan which includes a detailed workout program of specific exercises. The physical fitness expert then, by means of operations performed on a computer, selects a plurality of video segments each of which demonstrates a specific exercise of the detailed workout program in accordance with the determined specific fitness plan. These video segments are among a series of pre-recorded video segments stored in a library memory of the central processing unit. The physical fitness expert then, by means of further operations on the computer, arranges the selected video segments into a sequence corresponding to at least one arrangement of the specific exercises according to the specific fitness plan and possibly into several different arrangements. Then, by means of a DVD burner, the physical fitness expert records the sequentially arranged selected video segments onto a digital versatile disc (DVD) which can then be utilized by the individual in his personal computer or DVD player for personalized physical fitness instruction.

For those individuals who prefer a video tape rather than a DVD, the physical fitness expert can record a videotape of the personalized fitness program from the DVD.

In addition, the physical fitness expert can upload the sequentially arranged selected video segments of the specific fitness plan for an individual onto a web site which can then be made available for downloading by the individual. When the individual has downloaded the selected video components into his or her computer, the video can be viewed on screen.

It is also provided in accordance with the present invention, that the assessment of the individuals health conditions or limitations is accomplished by means of a computer program based on information supplied by the individual. Based on this assessment, the computer program devises a detailed workout program for the individual. The computer program then selects from among a series of video segments of different exercises a plurality of video segments each of which corresponds to a specific exercise of the detailed workout program devised by the computer program and also arranges the plurality of video segments into a sequential arrangement. A personalized fitness video file for the individual is derived based on the detailed workout program and made accessible to the individual on a secure website.

BRIEF DESCRIPTION OF THE DRAWINGS

Other objects and features of the present invention will become apparent from the following detailed description considered in connection with the accompanying drawings, in which.

DETAILED DESCRIPTION OF THE INVENTION

Figure 1:
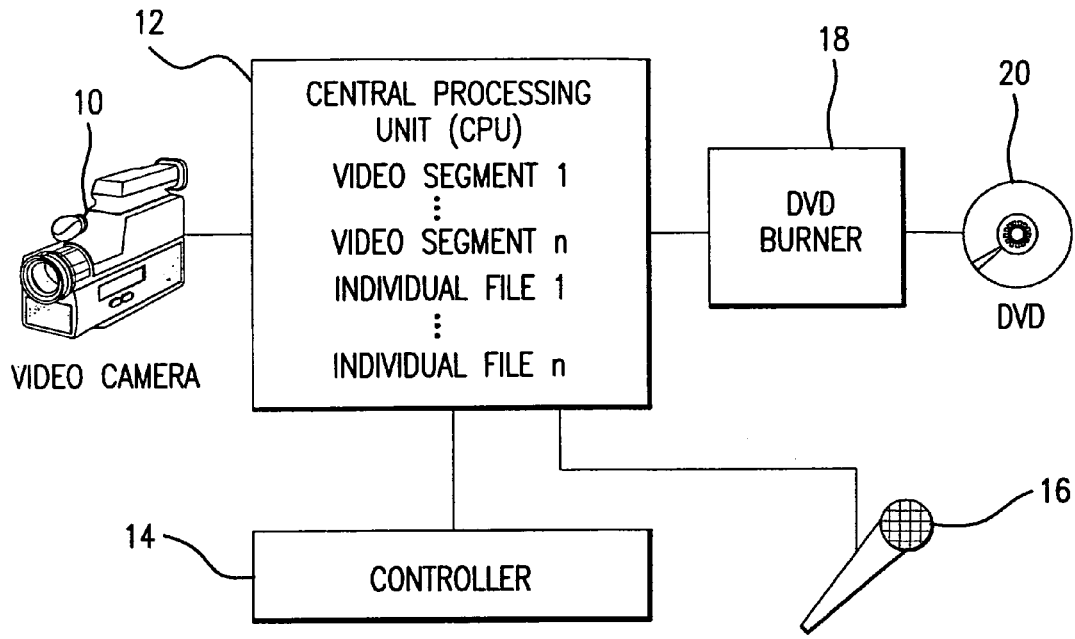
FIG. 1 is a schematic representation of the apparatus utilized in the system for producing a personalized fitness video on a digital versatile disc for an individual according to the present invention.

Initially, the physical fitness professional will pre-record a series of video segments 1 to n utilizing a video camera, designated 10 in FIG. 1. Each pre-recorded video segment of the series is a video demonstration of a specific exercise and/or variations of specific exercises. Thus, video segment 1 may demonstrate the push-up exercise, video segment 2 may demonstrate the deep knee bend, video segment 3 may demonstrate a typical warm-up exercise and so on. Included in the series of video segments 1 to n will also be video segments of exercises designed to address specific handicaps and physical problems or limitations. The recorded video segments 1 to n are recorded in the memory of a central processing unit 12 and stored therein. Subsequently, the physical fitness professional by operations performed on controller 14 and utilizing microphone 16, will insert voice over instructions as well as printed instructions on each of the video segments as necessary. Such instructions may further explain the demonstrated exercise or caution the viewer with respect to the exercise in order to avoid a possibility of injury.

The physical fitness professional can now proceed to produce a customized or personalized physical fitness video for an individual when approached to do so. First, the physical fitness professional interviews the individual desiring the personalized fitness video and assesses the individual's flexibility, cardiovascular condition, body fat composition, muscular strength and endurance. Any other health conditions or limitations that the individual may have are also taken into consideration by the physical fitness professional. Based on this assessment and taking into consideration the individual's needs and goals, the physical fitness professional determines a specific fitness plan which will include a detailed workout program of specific exercises. The fitness professional then returns to his or her computer and by utilizing controller 14 selects a video segment from the series of video segments 1 to n stored in central processing unit 12 for each specific exercise of the detailed workout program and arranges the selected video segments into one or more sequences corresponding to the specific fitness plan.

At this stage the fitness professional, utilizing microphone 16, can amend the voice over instructions associated with each selected video segment or insert totally new instructions as required for the benefit of the individual for whom the video is being created.

The resulting specific fitness plan is fixed in a file specific to the individual for whom it is created and stored in central processing unit 12 as individual file 1. Subsequent files, individual files 2 to n, corresponding to specific fitness plans for other individuals will also be stored in central processing unit 12 as those individuals are assessed and specific fitness plans developed.

By means of DVD burner 18, a digital versatile disc (DVD) fitness video, designated 20, is created from the specific individual file stored in central processing unit 12.

Figure 2:
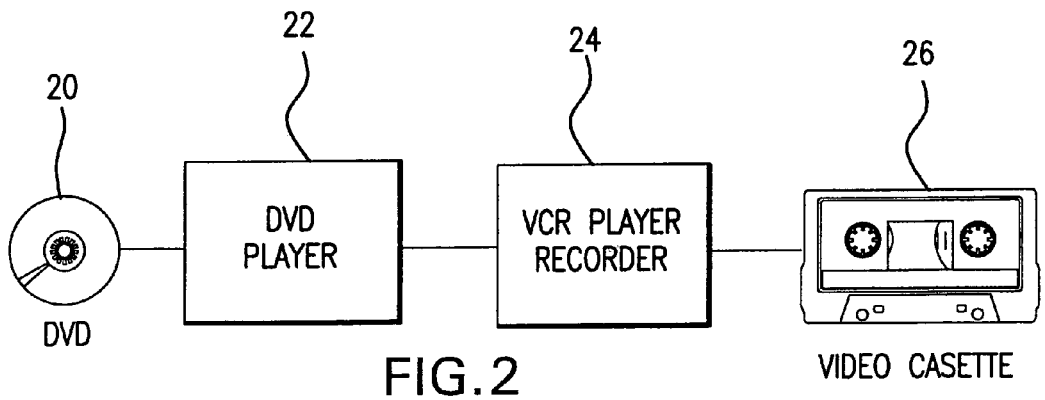
FIG. 2 is a schematic representation of the production of a video cassette of the personalized fitness video from a DVD thereof.

Thus, the individual for whom the fitness video is designed may utilize a personal computer for viewing and following the specific fitness plan or he may utilize a DVD player for viewing and following the specific fitness plan. On the other hand, if the individual wishes to have a video cassette of the fitness program made, as clearly seen in FIG. 2, DVD 20 is inserted into DVD player 22 to which a VCR player recorder 24 is connected and the video is recorded onto a blank video cassette resulting in a fitness video cassette 26.

Figure 3:
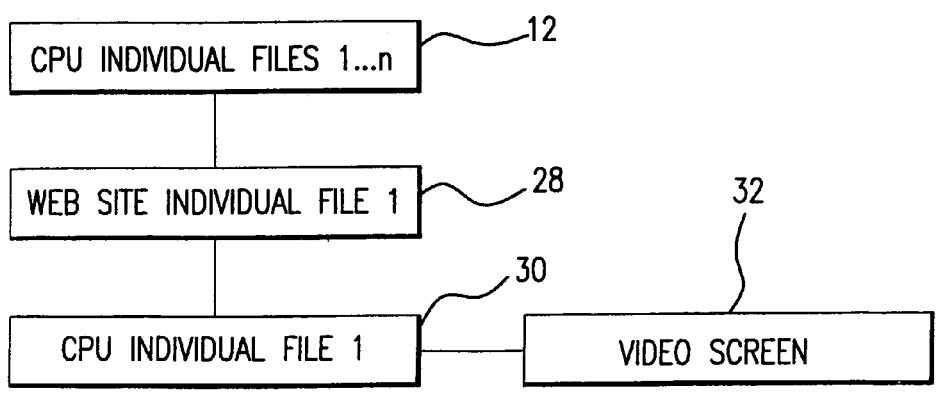
FIG. 3 is a schematic representation for the use of a secure web site for accessing a personalized fitness video.

Another option which can be made available to an individual for whom a specific fitness plan is developed and stored in central processing unit 12 as one of the individual files 1 to n is to permit access to the individual file via the internet. Thus, as clearly seen in FIG. 3, the fitness professional obtains a secure web site 28 from a web server and uploads, for instance, individual file 1 onto the web site which is then made available to the individual for whom the specific fitness plan of individual file 1 was developed. That individual will obtain an identification and password from the fitness professional so that he or she can download from web site 28 the video of individual file 1 into his or her computer or central processing unit 30 to be viewed on screen 32.

Subsequently, after the individual for whom the fitness video was designed has utilized the fitness video for a period of time, the physical fitness professional will reassess the individual so as to evaluate the progress made by the individual in following DVD fitness video 20, fitness video cassette 26 or secure web site 28. Based on this reassessment, the physical fitness professional may return to the file specific to this individual stored in central processing unit 12 and through controller 14 and microphone 16 make changes in the file as required. These changes may include additional specific exercises from video segments 1 to n and/or deletion from the file of certain specific exercises, changes to the voice over or printed instructions, sequence changes, etc. which, in the opinion of the physical fitness professional, are necessary or required.

Figure 4:
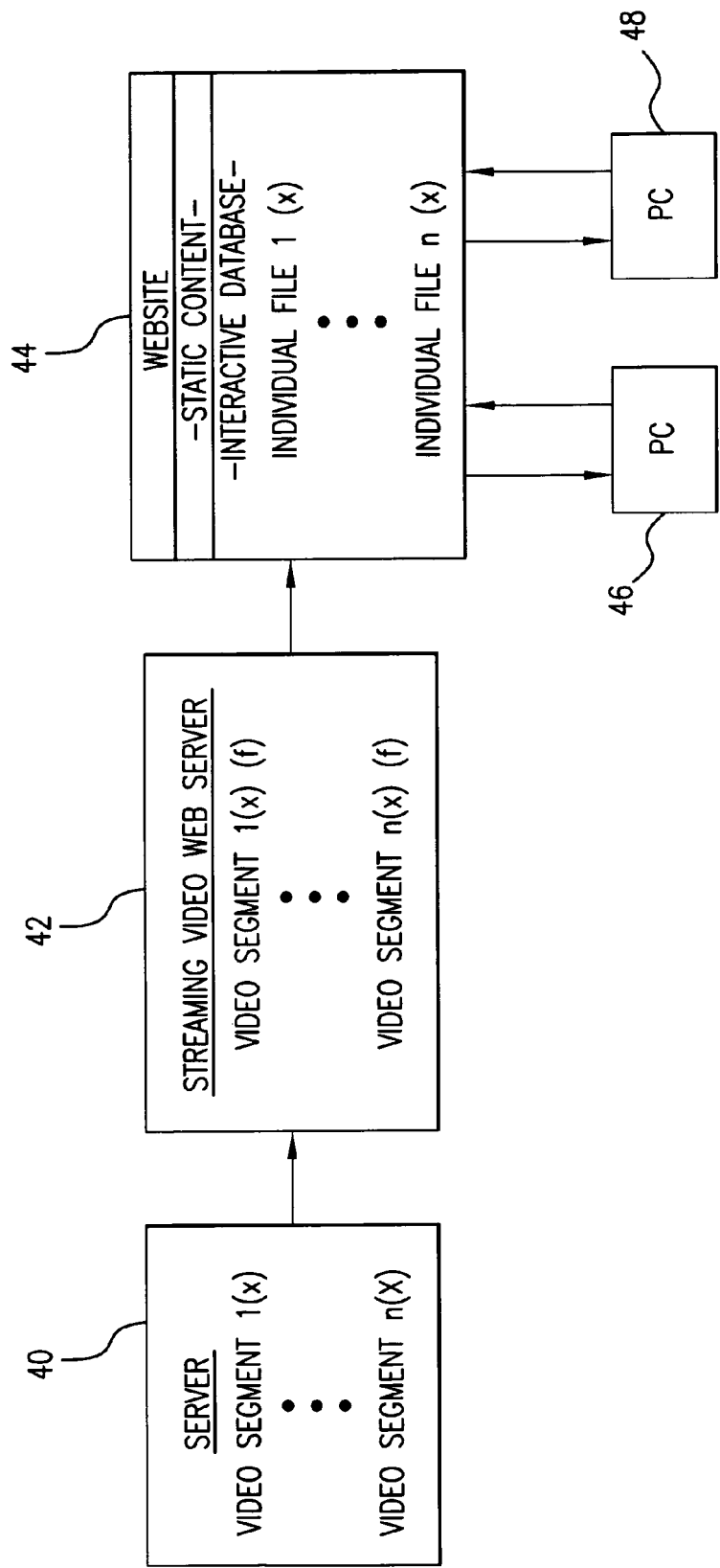
FIG. 4 is a schematic representation for the computer creation of a personalized fitness video and for accessing the same on a website.

FIG. 4 shows another embodiment which also takes advantage of the internet, wherein the fitness professional loads a series of pre-recorded video segments 1(x) to n(x) into a first server, designated 40. Each video segment 1(x) to n(x) is a video demonstration of a specific exercise. The video segments 1(x) to n(x) are then converted to various formats so that they can be displayed on the world wide web or the internet. The various formats include but are not limited to:

a) Windows Media Files video file format for Microsoft Windows (file extension.wmv);

b) QuickTime video file format by Apple Computer, Inc. for MacIntosh computers (file extension .mov);

c) Macromedia Flash Video file format (file extension.flv) and Macromedia Flash Movie SWF file (file extension.swf) format by Macromedia, Inc.;

d) IPod format for a specific brand mp3player that also can display video (file extension .m4v);

e) Audio Video Interleave File or AVI format by Microsoft Corporation (file extension .avi); and (f) MPEG file format (file extension .mpg).

Once converted to the various formats, the converted video segments 1(x)(f) to n(x)(f) are posted to a streaming video web server, designated 42. The converted video segments 1(x)(f) to n(x)(f) are made accessible through a secure web site, designated 44, which includes static content and an interactive database. The static content basically promotes the fitness professional's program, describing the mechanics of the program, its benefits, etc. The interactive database is programmed to transmit a registration form to the personal computer, designated 46, of an individual requesting an internet accessible personalized physical fitness video. The registration form requests physical information relating to that individual or another individual, exercise equipment available to the individual and the individual's physical fitness goals. Upon return, the completed registration form is stored in memory. A computer program accesses the information contained in the submitted registration form from which an assessment of the fitness needs of the individual is made and a specific fitness plan developed therefrom. The specific fitness plan itself includes a workout program of specific exercises in at least one sequential arrangement of specific exercises. From the converted series of video segments 1(x)(f) to n(x)(f) a plurality of converted video segments each corresponding to a specific exercise of the detailed workout program is selected and arranged into the at least one sequential arrangement of specific exercises as a personalized fitness video and fixed in a file specific to the individual for whom it is created and stored in the interactive database of web-site 44 as individual file 1(x).

Subsequent files, designated individual files 2(x) to n(x), corresponding to the specific fitness plans for other individuals will also be stored in the interactive database of web-site 44 as the individuals are assessed and specific fitness plans developed. Once individual file 1(x) has been created, the individual for whom it was created or the one requesting it will automatically be sent a message by email to computer 46 advising that the personalized fitness video is available for streaming or downloading. The individual then enters his ID and Password to gain access after which the specific fitness plan in individual file 1(x) will be available to him via his online account for streaming or downloading or he may obtain it in DVD format by mail.

It is also possible to assess the fitness needs of the individual and develop the specific fitness plan and resulting individual file 1(x) manually. Thus, the fitness professional, rather than a computer program, would make the assessment and select from among the converted series of video segments 1(x)(f) to n(x)(f) the plurality of converted video segments corresponding to the specific exercises of the detailed workout program. He would then arrange the selected video segments into the sequential arrangement of specific exercises of the individual's personalized fitness video file as individual file 1(x) which is then stored in the interactive database of the web-site 44. This can be accomplished by the fitness professional by operations performed on his personal computer, designated 48.

By means of personal computer 48, the fitness professional can gain access to web-site 44 to review completed registration forms submitted by individuals seeking personalized fitness videos and also review the individual files before they are accessed by the individuals for whom they are created. In this way, the fitness professional can monitor the interactive database of web-site 44.

It is to be understood that the foregoing general and detailed descriptions are explanatory of the present invention and are not to be interpreted as restrictive of the scope of the following claims.

What is claimed is:

1. A system for creating an internet accessible personalized fitness video for an individual, comprising:
   a) storing in a first computer server a series of video segments wherein each video segment is a demonstration of a specific exercise;
   b) converting each of the video segments of said series of video segments to a format suitable for display on the internet;
   c) posting said format converted series of video segments to a streaming video web server whereby the format converted series of video segments are accessible through a secure website wherein the web site includes static content and an interactive database;
   d) submitting to said web site, by operations performed on a personal computer, physical information relating to the individual seeking the personalized fitness video, exercise equipment available to said individual and physical fitness goals of said individual;
   e) assessing the fitness needs of said individual based on the information submitted in step (d) and developing a specific fitness plan based on said assessment including a detailed workout program of specific exercises in at least one sequential arrangement of specific exercises;
   f) selecting from among said converted series of video segments a plurality of converted video segments each of which corresponds to a specific exercise of said detailed workout program and arranging said plurality of converted video segments into said at least one sequential arrangement of specific exercises as a personalized fitness video file for said individual; and
   g) causing said personalized fitness video file to be accessible to said individual on said secure web site.

2. The system for creating an internet accessible personalized fitness video as defined in claim 1, wherein said personalized fitness video file is caused to be accessible to said individual by streaming the file to the individual's personal computer.

3. The system for creating an internet accessible personalized fitness video as defined in claim 1, wherein said personalized fitness video file is caused to be accessible to said individual by downloading the file to the individual's personal computer.

4. The system for creating an internet accessible personalized fitness video as defined in claim 1, wherein steps (e) and (f) are performed manually.

5. The system for creating an internet accessible personalized fitness video as defined in claim 1, wherein steps (e) and (f) are performed by a computer.

6. The system for creating an internet accessible personalized fitness video as defined in claim 1, wherein steps (e) and (f) are performed by a computer and are monitored.

7. The system for creating an internet accessible personalized fitness video as defined in claim 1, which further comprises notifying said individual for whom the personalized fitness video is created by e-mail to a personal computer available to said individual when the personalized fitness video becomes accessible.

8. The system for creating an internet accessible personalized fitness video as defined in claim 1, wherein the format into which the video segments are converted for display on the internet comprises file extension.wmv.

9. The system for creating an internet accessible personalized fitness video as defined in claim 1, wherein the format into which the video segments are converted for display on the internet comprises file extension.mov.

10. The system for creating an internet accessible personalized fitness video as defined in claim 1, wherein the format into which the video segments are converted for display on the internet comprises file extension.flv.

11. The system for creating an internet accessible personalized fitness video as defined in claim 1, wherein the format into which the video segments are converted for display on the internet comprises file extension.swf.

12. The system for creating an internet accessible personalized fitness video as defined in claim 1, wherein the format into which the video segments are converted for display on the internet comprises file extension.m4v.

13. The system for creating an internet accessible personalized fitness video as defined in claim 1, wherein the format into which the video segments are converted for display on the internet comprises file extension.avi.

14. The system for creating an internet accessible personalized fitness video as defined in claim 1, wherein the format into which the video segments are converted for display on the internet comprises file extension.mpg.

* * * * *